(12) United States Patent
Ribarich et al.

(10) Patent No.: US 7,126,288 B2
(45) Date of Patent: Oct. 24, 2006

(54) DIGITAL ELECTRONIC BALLAST CONTROL APPARATUS AND METHOD

(75) Inventors: Thomas J. Ribarich, Laguna Beach, CA (US); Peter Green, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 19 days.

(21) Appl. No.: 10/840,030

(22) Filed: May 4, 2004

(65) Prior Publication Data

US 2004/0232855 A1    Nov. 25, 2004

Related U.S. Application Data

(60) Provisional application No. 60/468,279, filed on May 5, 2003.

(51) Int. Cl.
H05B 37/02    (2006.01)
(52) U.S. Cl. .................. 315/308; 315/360
(58) Field of Classification Search ........ 315/224–225, 315/291–292, 307–308, 360, DIG. 5, DIG. 7, 315/312
See application file for complete search history.

(56) References Cited

U.S. PATENT DOCUMENTS

| | | | |
|---|---|---|---|
| 4,680,508 A * | 7/1987 | Rucki ................ 315/166 |
| 6,008,593 A | 12/1999 | Ribarich ............. 315/307 |
| 6,150,772 A * | 11/2000 | Crane ............... 315/291 |
| 6,259,614 B1 | 7/2001 | Ribarich et al. ...... 363/89 |
| 6,307,765 B1 * | 10/2001 | Choi ................ 363/134 |
| 6,573,666 B1 * | 6/2003 | Killat .............. 315/291 |
| 6,771,029 B1 * | 8/2004 | Ribarich et al. ...... 315/292 |
| 6,825,620 B1 * | 11/2004 | Kuennen et al. ...... 315/224 |

* cited by examiner

Primary Examiner—Thuy Vinh Tran
(74) Attorney, Agent, or Firm—Ostrolenk, Faber, Gerb & Soffen, LLP (57) ABSTRACT

A ballast control may include a digitally controlled oscillator to provide a precise and consistent oscillation frequency for switching a half-bridge circuit in the electronic ballast. The ballast control may include a digital memory device for storing ballast control operational parameters. A controller can access the digital memory to retrieve parameter values and apply them to various ballast control components. A counter in the ballast control counts a number of events, such as an over current event, and provides a signal when a predetermined count is reached to contribute to identifying fault conditions. The controller may contain one or more timers to time durations related to events in the electronic ballast, such as the initiation of an ignition current. The digital nature of the ballast control permits a wide degree of flexibility in providing operational set points and reacting to conditions in the electronic ballast and simplifies the ballast control.

23 Claims, 4 Drawing Sheets

DIGITAL ELECTRONIC BALLAST CONTROL APPARATUS AND METHOD

RELATED APPLICATION

The present application is based on and claims the benefit of U.S. Provisional Application No. 60/468,279, filed May 5, 2003, entitled X CHIP, to which a claim of priority is hereby made.

BACKGROUND OF THE INVENTION

1. Field of the Invention

The present invention relates generally to electronic ballasts for lighting circuits, and relates more particularly to a digital electronic ballast with programmable features.

2. Description of Related Art

Electronic ballasts for fluorescent lighting applications are widely available and well known, particularly those that operate with a switching half-bridge. Such an electronic ballast is illustrated in U.S. Pat. No. 6,008,593 to International Rectifier Corporation. Electronic ballast controls have evolved to include a wide range of functionality and features, including power factor correction, fault detection and a variety of safety features.

A typical electronic ballast with a switching half-bridge provides an oscillator that is used to derive the switching signals for the half-bridge switches to appropriately direct current to various components at particular times to establish a power flow to the lamp load. One type of implementation of an electronic ballast using an oscillator involves connecting a Voltage Controlled Oscillator (VCO) with a feedback signal from the switching half-bridge to modify the VCO frequency in accordance with desired operational parameters. For example, in the case of fluorescent lamp dimming applications, the switching frequency of the electronic ballast can be adjusted to obtain particular dimming settings.

The use of a VCO in an electronic ballast entails a number of design challenges that include appropriately providing the input to the VCO to obtain the desired oscillation frequency. Typically, the input to the VCO is an analog signal, the magnitude of which determines the oscillator frequency. It is often the case that analog signals in electronic ballasts are subject to noise or interference, potentially causing the frequency of the VCO to vary unexpectedly.

Although the use of a VCO in an electronic ballast can reduce the requirements for external extensions to the electronic ballast control, a number of other desirable features typically use external components to program parameters for the features. For example, pre-heat time and frequency are often programmed by passive components connected externally to the ballast control. Similarly, an ignition frequency and maximum current level is programmed using external passive components. The operational switching frequency and other run time parameters determined in conjunction with the operation of the VCO are often set by external components that are specifically selected for a desired operational set point. For example, in the case of pre-heat time, an external capacitor may be connected to a control IC for the electronic ballast, so that pre-heat operation occurs while the capacitor charges, and terminates when the capacitor charges to a specified value. As a consequence of providing a number of features in the electronic ballast control, the number of external components are connected to the control to implement parameter selection for the features of the specific application.

One technique to implement a high degree of functionality without numerous external components in an electronic ballast control is to provide a micro-controller that typically includes a processor, memory, input and output control and optionally some form of a communication interface. By using a micro-controller as a basis of an electronic ballast control, a number of features can be realized including frequency control, pre-heat control, ignition control and feedback and a number of fault protections. However, micro-controller devices are relatively expensive with respect to electronic ballast controls, and can occupy a significant portion of the cost for providing an electronic ballast. In addition, the functionality of a micro-controller is often underused, because the majority of functions useful in providing a ballast control can be implemented with a fairly small percentage of the resources available in the micro-controller.

A difficulty often encountered in semiconductor circuits and in ballast controllers is a certain degree of inconsistency in performance parameters of the silicon circuits. For example, manufacturing tolerances and the nature of silicon circuit structures can combined to provide somewhat inconsistent results for operating silicon circuits at a desired set point. That is, to achieve a desired set point of operation for a silicon circuit, the circuit operational parameters should be obtained relative to the individual circuit, rather than as an independent static set point parameter. For example, an oscillator implemented in silicon designed to oscillate at a certain frequency may have a large degree of variation based on tolerances of circuit components and manufacturing tolerances. If a precise frequency is desired, an oscillator control should be provided that compensates for the individual tolerances of the oscillator circuit to provide a specific frequency.

Accordingly, it would be desirable to provide a simplified low cost ballast control that can be easily implemented with a simplified, programmable relative control that decreases uncertainties with respect to static circuit parameters.

SUMMARY

According to the present invention, there is provided a ballast control with a digitally controlled oscillator and programmable feature set points that does not rely on a micro-controller and is not dependent upon static tolerances of silicon components. The digitally controlled oscillator permits a programmable aspect to operation of the electronic ballast without additional external components. Other internally programmable features include programmable dead time, shut down circuitry, duty cycle programmability and programmable ignition current parameters.

The ballast control may be programmed one time, or re-programmable depending upon the application in which the ballast control will be used. A simple technique for one time programming of the ballast control includes a two pin protocol, where one pin carries a clock signal and the other pin carries a data signal. Using this protocol, a large amount of data may be stored in the ballast control for a number of parameters to control various ballast control features. The ballast control may incorporate a programmable timer that can produce the required time periods for pre-heat, ignition, and running modes. The data in the ballast control can be configured to be read only, so that a one-time programming scheme reduces the complexity of the ballast control device.

Other features and advantages of the present invention will become apparent from the following description of the invention which refers to the accompanying drawings.

DETAILED DESCRIPTION OF THE FIGURES

Figure 1:
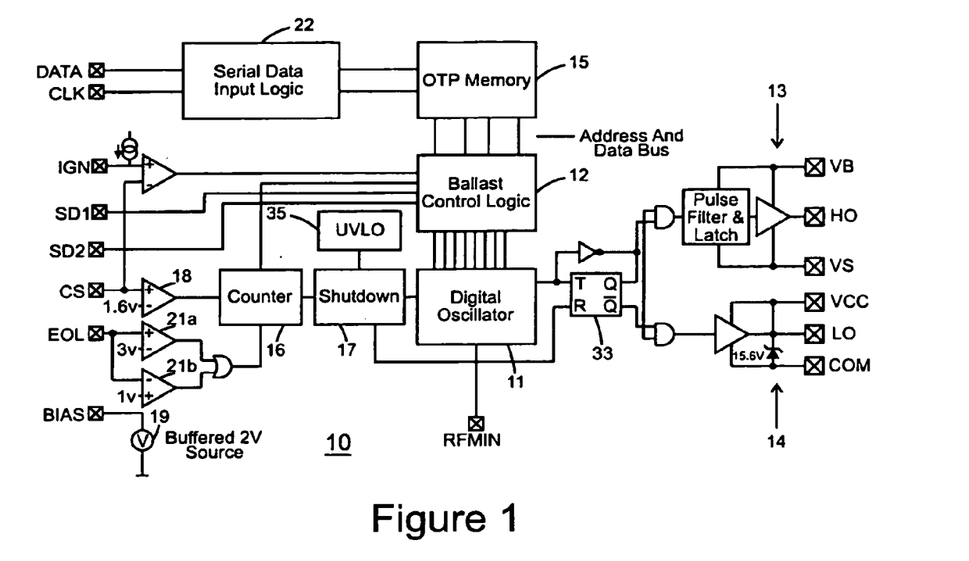
FIG. 1 is a block diagram of the system architecture of the electronic ballast control according to the present invention.

Referring now to FIG. 1, a system block diagram of a ballast control 10 according to the present invention is illustrated. A digital oscillator 11 is programmed with digital information from ballast control logic 12 to provide an oscillation frequency supplied to the high and low side half-bridge drivers 13, 14, respectively. Control logic 12 supplies digital signals to digital oscillator 11 to obtain oscillation frequencies for features such as pre-heat, ignition and normal running conditions without the use of external passive components. A passive component such as a resistor, may be connected to input RFMIN to set a minimum frequency output, so that digital oscillator 12 has a frame of reference for outputting a range of frequencies. Control logic 12 can supply the desired information to produce any particular frequency from digital oscillator 11 with a high degree of precision over a wide range. The digital input to digital oscillator 11 can be stored in ballast control 10 in a storage memory 15 so that any particular type of frequency operating parameter can be recalled from memory 15 and applied to digital oscillator 11 to produce the desired oscillation frequency. Memory 15 is preferably firmware programmable, that is, the memory is used as read only memory the majority of the time, and infrequently written to, such as in the case of being adapted to a new application. To reduce costs further in ballast control 10, memory 15 is preferably one time programmable, so that no additional functionality need be provided to overwrite or remove a previous program.

Ballast operating parameters stored in memory 15 may be read through control logic 12 and applied to digital oscillator 11, for example. Since memory 15 is preferably non-volatile, once parameters are stored in memory 15, they may be consistently read in the operation of ballast control 10. Accordingly, such features as dead time or fault duration times prior to enunciating a fault condition may be stored in memory 15, in addition to various digital values for operating digital oscillator 11 to realize pre-heat, ignition and normal run mode frequencies.

By providing a programmable dead time for switching the switches driven by half-bridge drivers 13, 14, and by providing a programmable frequency of switching, the duty cycle of the switching signals supplied by half-bridge drivers 13, 14 is also programmable. For example, some ballast control operations rely on a variable duty cycle method of control to supply power to a resonant load such as a gas discharge lamp. Ballast control 10 can provide a variable duty cycle with a fixed frequency to achieve variable duty cycle control through the configuration of ballast control 10.

In the case of the detection of a fault, a counter 16 may be programmably controlled through control logic 12 to have a count number that is chosen to represent how many current transients may be experienced by the fault detection circuitry prior to enunciating a fault condition. The count parameter may be stored in memory 15 and retrieved and loaded into counter 16 to adjust the number of faults detected before producing a fault indication. Optionally, the counter may be used to count current transients and latch high and low side drivers 13, 14 into an off state when the programmed count is reached. Shut down circuit 17 receives various signals that can indicate a fault condition in the electronic ballast or lamp, and act to disable digital oscillator 11 or high and low side half-bridge drivers 13, 14. Shut down circuit 17 can be set to activate shut down signals during particular phases of operation, such as in pre-heat mode, during the start of ignition mode, or in normal run mode, for example.

Another feature possible through programmable functionality is regulated ignition. Signal CS supplied to comparator 18 offers a feedback signal that allows ignition current to be detected, and thus regulated through ballast control 10. For example, counter 16 can be operated to provide a time interval during which the ignition current is measured and regulated. Alternately, control logic 12 includes timers that can be loaded with a time duration for measuring and regulating ignition current. The timer values may be retrieved from memory 15. Comparator 18 can also have a threshold input to limit that amount of ignition current to be supplied to the load during the ignition mode. The period of time for regulating the ignition current may be programmable, as well as the ignition current limit. Counter 16 may also be used to provide a constraint for the end of life circuit operated with input signal EOL. For example, if the EOL signal indicates an out of range condition, meaning the lamp is operating in a state that indicates it is nearing the end of its useful life, counter 16 can be used to verify that the EOL signal is maintained for a certain period of time to avoid spurious indications that may be the result of noise or interference. Alternately, a timer in control logic 12 may perform this function. Although the regulated ignition current level may be set in a number of different ways, including an external passive component such as a resistor, the value is preferably programmable so that it may be flexibly determined for a given application.

Ballast control 10 also provides a two volt sourcing and sinking buffered bias output 19 that can be isolated from the AC power supply of the electronic ballast. A resistor divider network may be coupled to the lamp output and returned to a two volt reference. The variable reference and bias allows the end of life window comparators 21A, 21B to detect excessive lamp voltages in either the positive or negative direction. By eliminating AC coupling with bias output 19, several circuit delays are eliminated and a higher capacitance may be provided on the EOL signal connection to improve noise immunity without excessively delaying the reaction to the end of life conditions. A larger capacitor on the connection to the EOL signal combined with the use of counter 16 to count EOL detection events contribute to increasing the reliability of the end of life detection circuit and reduces the susceptibility of the EOL signal to false tripping, especially directly after ignition of the lamp.

FIG. 1 illustrates two shut down signals SD1 and SD2 connected to control logic 12 to indicate the detection of a lamp removal. Shut down signals SD1 and SD2 operate with the lower filament of the lamp to hold the shut down signal to common reference COM when the lamp is present. A resistor pulls the shut down input to voltage VCC, and thus above an internal threshold, in control logic 12, for example, to indicate the removal of a lamp. By providing two shut down inputs SD1 and SD2, ballast control 10 provides an advantageous feature that may be used in a two lamp ballast design, because ballast control 10 can be digitally configured to shut down if either lamp is removed, or to continue running if one lamp is removed and to initiate a start up sequence when one lamp is replaced. By permitting the flexibility of continuing operation of the electronic ballast while one lamp is removed, a flexible two lamp ballast may be fully realized without additional external circuitry, as is used in the case of existing ballast controls for two lamp circuits.

The present invention provides a technique for supplying data to memory 15, whether memory 15 is a one time programmable memory or a re-programmable memory. A serial data input logic block 22 is connected to memory 15 and supplies programming signals to place data in particular locations in memory 15. Serial input logic block 22 receives clock signal CLK and data signal DATA and translates the signals into data signals appropriate for writing to memory 15. Each parameter to be stored in memory 15 is clocked into ballast control 10 using signals DATA and CLK with a low-to-high transition at the clock input. When the low-to-high transition occurs at the clock input, a bit is read from the data input signal DATA. Serial input logic block 22 reads the bits that are clocked into ballast control 10 from the input signal DATA and determines an eight bit code to indicate which parameter is to be stored in memory 15. Following the eight bit code identifying the parameter, an eight or twelve bit numerical parameter is transmitted that can represent a delay value, a frequency value, or a configuration arrangement that can set different options for ballast control 10. For example, configuration options can be provided for shut down features and other types of functions. Using this type of serial scheme to input and store data in memory 15, each parameter need only be read once and signal lines DATA and CLK are the only input lines needed to store the data.

In accordance with a feature of the present invention, a user interface for programming ballast control 10 through serial input logic block 22 and memory 15 is provided for operation in conjunction with ballast control 10. The user interface provides selectable parameters for the various components of ballast control 10 and the various operational modes, such as pre-heat, ignition and normal run mode. A user accesses the user interface to select the desired parameters for ballast control 10 and initiate the loading sequence to store the parameters in memory 15 through serial data input logic block 22. The use of the user interface contemplates a programming JIG or device that is connected to ballast control 10 to load the parametric data supplied from the user interface into memory 15. When ballast control 10 is implemented as an individual integrated circuit (IC), ballast control 10 may be programmed using the user interface and programming device separately from an application installation. That is, the IC incorporating ballast control 10 may be programmed off line and then incorporated into a device for a given application. Alternately, a programming device and user interface may be provided to connect with ballast control 10 when it is implemented in an electronic ballast. Accordingly, the programming device provides connections to signals DATA and CLK for transferring parameters to memory 15 through serial data input logic block 22. The user interface and programming device can be configured to be user friendly so that simplistic and repeatable parameters set up operations may be conducted on a rapid basis, such as in the case of automated production for ballast control 10.

Using the storage technique for supplying data to memory 15, a number of adjustable ballast control parameters can be provided to ballast control 10. For example, ballast control logic 12 may incorporate a programmable timer that can read values from memory 15 to set timed events, such as pre-heat mode duration, ignition current limit duration or a run time start up sequence duration, as determined by the application and the electronic ballast. Accordingly, control logic 12 can be realized in a straightforward design, since its main function is to read data from memory 15 based on input signals or other logic events determined by control logic 12, and store the data values in selected locations, such as in counter 16 or digital oscillator 11. Control logic 12 need not have a high degree of processing power to realize a robust and flexible control for the electronic ballast.

Serial data input logic block 22 is preferably used during the initial programming stage of ballast control 10, and remains unused for transferring data after that point. It should be apparent that serial input logic block 22 may be reused if memory 15 may be reprogrammed or rewritten. For example, memory 15 may be composed of a replaceable element so that ballast control 10 may be reprogrammed for different applications. Alternately, memory 15 may be made erasable so that new data may be written to memory 15 after it is cleared of previous data.

In addition, input signals DATA and CLK may be connected to additional logic to permit the pins to be used for other purposes once data has been loaded into memory 15. For example, other feedback or control operations may be realized using the connections for signals DATA and CLK after memory 15 is loaded with the data used to operate ballast control 10. For example, one of the codes provided to serial data input logic block 22 may act as an end of transmission marker, upon the reception of which the connections for signals DATA and CLK may be switched to another circuit and are inaccessible to serial data input logic block 22. It should be apparent that a reset may be performed to reconnect signals DATA and CLK to serial data input logic block 22, such as in the case when memory 15 is to be reprogrammed, for example. For simplicity sake, and to reduce the design and implementation costs of ballast control 10, serial data input logic block 22 is preferably unused after the initial programming stage, since memory 15 is a preferably one time programmable memory that is not written by ballast control 10, but only read by control logic 12.

Control logic 12 may read memory 15 by internal address and data buses to speed operation of ballast control 10. The simple configuration of providing memory 15 as a read only memory permits a reduction in complexity of ballast control 10 because no write operations to memory 15 need be performed after the initial programming. Without the need to write information to memory 15, there is no need to have any hand shaking or communication lines between memory 15 and other devices. Accordingly, a simple control scheme can be realized that handles all the functionality for a flexible and sophisticated ballast control 10 without providing resources that may be unused, as may be the case when a micro-controller is used to realize a ballast control. Control logic 12 simply reads data from memory 15 based on addresses provided to memory 15 and directs the data to the relevant device as specified. Memory addresses to access memory 15 may come from control logic 12 or other sources, such as serial input logic block 22.

Ballast control 10 may also be implemented to provide Power Factor Correction (PFC) to make the electronic ballast appear as a resistive load to the input power lines.

That is, by providing PFC with a power factor close to unity, the input current is drawn by the electronic ballast to be substantially in phase with the input voltage, so that the electronic ballast appears not to have any impedance effect other than that provided by a purely resistive load.

A device and method for providing PFC with a reduced amount of control and feedback signals is discussed in U.S. Pat. No. 6,259,614 to International Rectifier Corporation, the content of which hereby incorporated by reference in its entirety. The PFC circuitry and method disclosed in that patent may be implemented with only four pins from an electronic ballast control, and is suitable for implementation in ballast control 10. Ballast control 10 can be realized in a sixteen pin package, so that the addition of PFC circuitry with the additional four pins would be implemented in a twenty pin package. However, if the DATA and CLK signals were adapted for other purposes after memory 15 is loaded, and if only a single shut down input SD1, for example, were used, ballast control 10 with a PFC circuit could be realized in a sixteen pin package. That is, while it is possible to implement PFC circuitry and ballast control 10 in a single twenty pin package, which is entirely reasonable for this type of application, by reusing certain connections in ballast control 10, and slightly reducing the shut down feature functionality, a further reduction in connection requirements may be realized, even when PFC circuitry is provided.

In previous applications implementing a digital ballast control, three different ICs are typically needed: a PFC controller; a micro-controller and a low/high side driver IC. In accordance with the present invention, a digital electronic ballast control is provided that replaces all three ICs, and provide the same or better functionality with a significantly reduced cost due to the high efficiency of resource utilization. In addition, ballast control 10 provides a large degree of flexibility while maintaining high precision because parameter values can be digitally programmed. Other types of control schemes are available for electronic ballasts that use an even further reduced number of connections, which can be realized in ballast control 10 while maintaining digital control and functionality.

Figure 2:
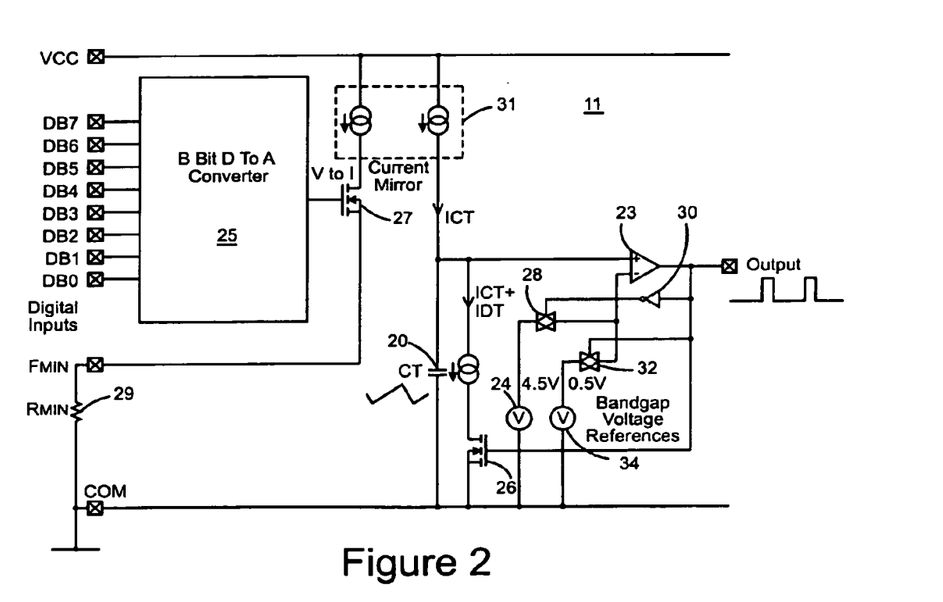
FIG. 2 is a schematic block diagram of a digitally controlled oscillator in the electronic ballast control of the present invention.

Referring now to FIG. 2, a detailed circuit schematic of digital oscillator 11 is illustrated. Digital oscillator 11 includes a Digital to Analog Converter (DAC) 25, which is illustrated as an eight bit DAC. However, it should be apparent that other DAC types are available, such as a twelve bit DAC which can be used without deviating from the present invention as described in more detail below.

The output of DAC 25 is connected to the gate electrode of MOSFET 27. The operation of MOSFET 27 is controlled by the output of DAC 25. The source electrode of MOSFET 27 is series connected with resistor 29 labeled RMIN, which is electrically connected to the common reference point COM. Resistor 29 determines the minimum frequency of digital oscillator 11, as described above with respect to input RFMIN.

The drain electrode of MOSFET 27 is connected to a current mirror circuit 31, which in turn is connected to the input voltage VCC. When DAC 25 turns on MOSFET 27, current flows through resistor 29. At the same time, current flows to a capacitor 20, labeled CT, through current mirror 31. The time period for capacitor 20 to charge is dependent upon the amount of current provided to capacitor 20, which is set by the value of resistor 29. By appropriately selecting the value of resistor 29, the minimum amount of current received by capacitor 20 may be selected, thereby determining a minimum charge time for capacitor 20 and thus the minimum frequency of digital oscillator 11. Preferably, resistor 29 is an external resistor to ballast control 10, so that it is completely user selectable.

In particular, digital oscillator 11 can be completely realized in an integrated silicon structure subject to manufacturing and component tolerances, as discussed above. By providing resistor 29 as an external component, a user may provide a relative reference for digital oscillator 11 that overcomes the static variations in operating parameters for digital oscillator 11 based on manufacturing and component tolerances. Thus, a user wishing to obtain a particular frequency base and range for the output of digital oscillator 11 can specifically select resistor 29 to meet the needs of the application independent of manufacturing and component tolerances present in digital oscillator 11.

Figure 3:
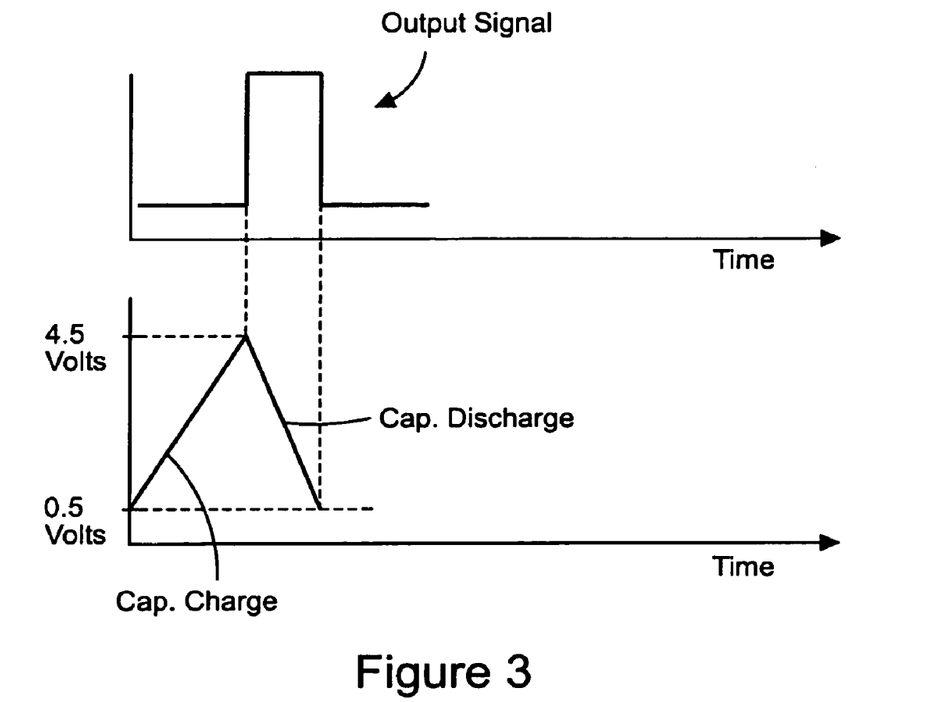
FIG. 3 is a set of graphs illustrating oscillation operation of the oscillator circuit of FIG. 2.

When the charge on capacitor 20 reaches an appropriate level, for example, when capacitor 20 is charged to a desired maximum voltage, capacitor 20 is discharged until it reaches another appropriate charge level, for example, a minimum voltage value. As a result, an oscillating waveform is created, which is then output to other signal conditioning circuitry as appropriate. Specifically, oscillator 11 includes a single comparator 23 that compares the voltage across capacitor 20 to a first reference voltage source 24. As long as the voltage across capacitor 20 remains below the reference voltage provided by the first reference voltage source 24, the output signal is low as shown in FIG. 3. When the voltage across capacitor 20 reaches a value above the voltage provided by the first reference voltage source 24, the output signal turns MOSFET 26 on. As a result, capacitor 20 is discharged to ground through MOSFET 26. The current which is discharged includes the current (ICT) that is received from current mirror 31 and the charge in capacitor 20 (IDT). Thus, capacitor 20 charges up with current ICT, set by resistor 29, and discharges with current IDT. Such an arrangement contributes to the speed of the circuit. It should be noted that the duration of current IDT corresponds to the pulse width of the output signal.

When it is determined that the voltage across capacitor 20 has reached a value above the voltage set by first voltage reference 24, the output signal is shifted from the digital low to a digital high. As a result, transmission gate 28 receives no enable signal due the presence of inverter 30, and is turned off thereby disconnecting first voltage reference 24 from comparator 23. At the same time, transmission gate 32 is turned on, thereby connecting a second voltage reference source 34 to comparator 23. At this point, comparator 23 compares the voltage across capacitor 20 to the voltage provided by the second voltage reference 34. When the voltage across capacitor 20 reaches a voltage provided by the second voltage reference source 34, a low signal is output from comparator 23, that turns off transmission gate 32 to cut off second voltage reference source 34 and turns on transmission gate 28 through inverter 30, thereby connecting first voltage reference source 24 to comparator 23. In addition, MOSFET 26 is turned off which allows capacitor 20 to charge up again. As a result, the output pattern shown in FIG. 3 is generated by the charging and discharging of capacitor 20. Thus, as stated earlier, the minimum frequency may be set by selecting an appropriate resistance value for resistor 29.

The output of digital oscillator 11 is a pulse train that may be appropriately directed to high and low side half-bridge drivers 13, 14 illustrated in FIG. 1. As shown in FIG. 1, a T-Flip Flop 33 may receive the output of digital oscillator 11 to drive high and low side half-bridge drivers 13, 14.

Digital oscillator 11 permits digital variation of the switching frequency of ballast control 10, which can be made to change slowly to obtain precise control. When all digital inputs to DAC 25 are logic low, the minimum frequency output depends upon the value of resistor 29. As the digital inputs to DAC 25 vary, the frequency changes, preferably by small amounts, with a precise and repeatable step.

Figure 4:
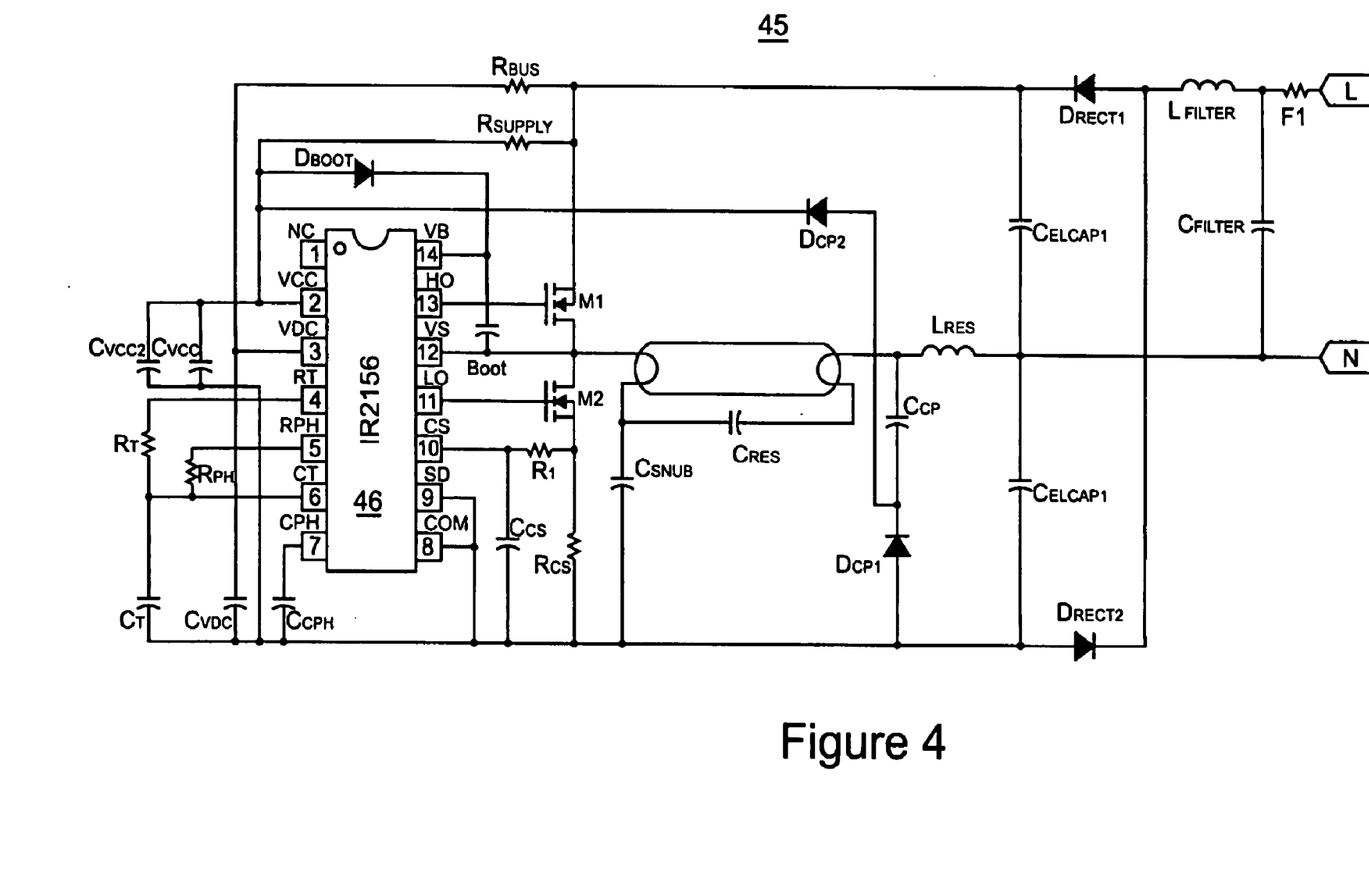
FIG. 4 illustrates a circuit diagram of an electronic ballast application.

Referring now to FIG. 4, a typical electronic ballast circuit for driving a switching half-bridge circuit composed of switches M1, M2 is illustrated as circuit 45. The gating for switches M1 and M2 are provided by ballast control 46 on outputs HO and LO, respectively. The gating signals on outputs HO and LO may be derived in accordance with digital oscillator 11, as discussed above.

Figure 5:
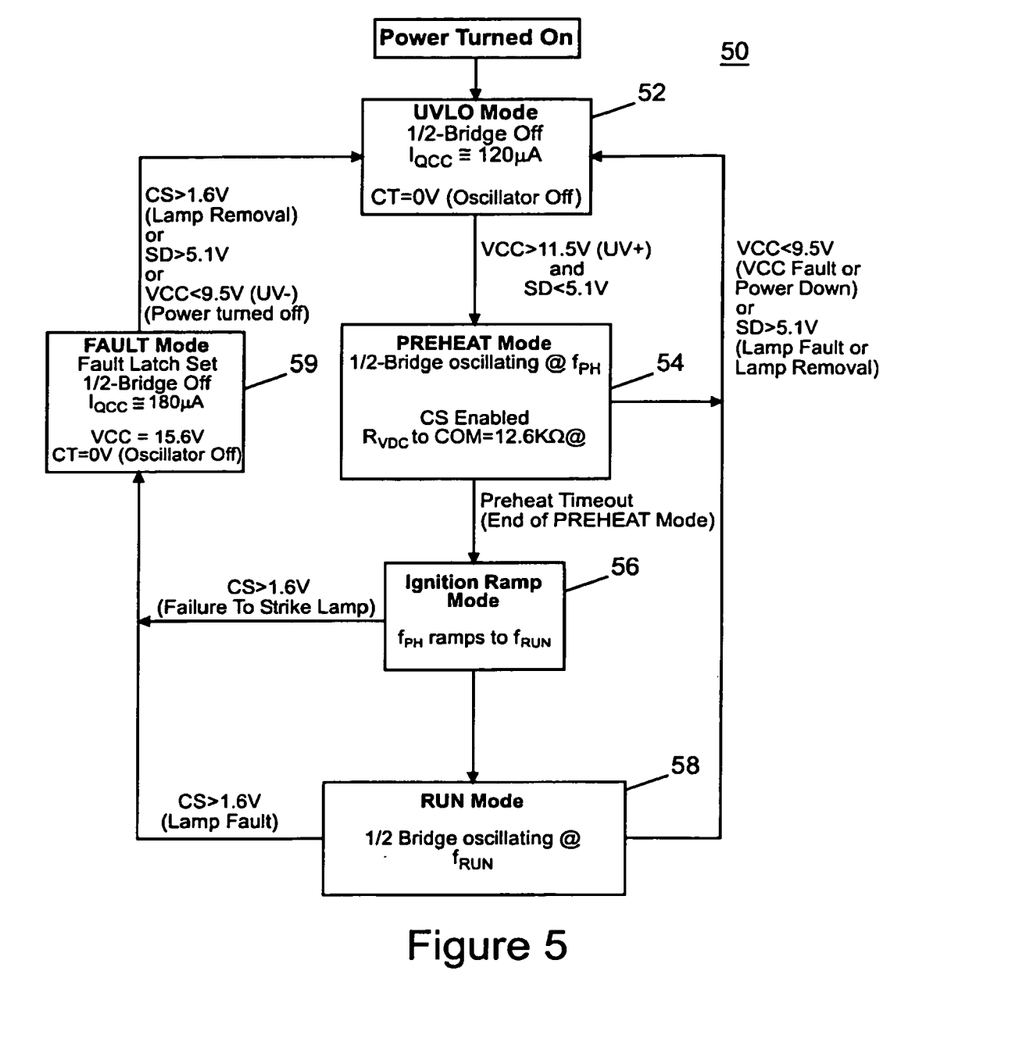
FIG. 5 is a state flow diagram of an exemplary electronic ballast control operation according to the present invention.

Referring now to FIG. 5, a state diagram for exemplary operation of ballast control 10 is illustrated generally as diagram 50. In accordance with diagram 50, after power is turned on to the electronic ballast, ballast control 10 enters under voltage lockout mode in state 52. The under voltage lockout mode circuitry is illustrated generally in FIG. 1 as UVLO block 35. In under voltage lockout mode, half-bridge drivers 13, 14 provide no gate drive signals for switching the half-bridge, and a quiescent current of approximately 120 microamps is supplied to permit circuit operation at a very low level. Also in this state, digital oscillator 11 may be disabled, and a pre-heat timing value may be input into control logic 12, with a frequency value for pre-heat provided to digital oscillator 11. During state 52, in normal operation, energy is supplied to components in the electronic ballast, which drives the electronic ballast to an initial startup condition. Accordingly, once voltage VCC is greater than 11.5 volts, the under voltage high threshold UVLO+, and the voltage on pins SD 1 and SD2 is greater than 5.1 volts, no faults are indicated and ballast control 10 transitions to state 54 to begin pre-heat mode.

In pre-heat mode state 54, digital oscillator 11 is enabled and half-bridge drivers 13, 14 begin providing gating signals to transistors M1, M2 to start oscillation at the pre-heat frequency $f_{pH}$, as set by the inputs to DAC 25. Pre-heat mode duration is set by a value applied to a timer in control logic 12. During pre-heat mode, current sensing is enabled at some period of time where a false reading on signal CS of ballast control 10 will not occur. That is, during startup, fault conditions may occur due to the changing circuit parameters realized on startup. To avoid serious fault detection, various fault detection components are not enabled until a certain operating point is reached so that false detection of faults is avoided on startup. Ballast control 10 exits pre-heat mode in state 54 to ignition mode in state 56 once fault detection is enabled and the timer control and pre-heat duration in control logic 12 times out. Alternately, ballast control 10 transitions from state 54 to state 52 when a fault is detected, including an input power fault where a voltage VCC is less than approximately 9.5 volts, or a lamp fault is detected where the voltage on connections SD1 or SD2 is greater than 5.1 volts.

At the end of pre-heat mode in normal operation, ballast control 10 transitions from state 54 to state 56 to ignite the lamp. During ignition mode, DAC 25 may be loaded with another frequency value, or ramped to a given frequency value $f_{RUN}$ based on signals provided by control logic 12. As the frequency output of DAC 25 changes to modify the frequency of ballast control 10, ignition of the gas discharge lamp is expected. If no over current condition is detected, that is, the lamp has presumably ignited, ballast control 10 transitions from state 56 to state 58 for normal run mode. Alternately, if there is an over current fault detected for failure to ignite the lamp in state 56, connection CS of ballast control 10 sees a voltage of greater than approximately 1.6 volts to indicate an over current fault. In the event of a fault, ballast control 10 transitions from ignition mode and in state 56 to fault mode in state 59.

During normal running conditions in run mode state 58, the half-bridge composed of switches M1 and M2 oscillates at a set frequency $f_{RUN}$ provided as a digital value on the inputs of DAC 25. During normal run mode, the lamp continues to operate until there is a power disruption or a lamp fault. In the case of a power disruption, if a voltage VCC drops below 9.5 volts, ballast control 10 transitions from state 58 to state 52 to return the electronic ballast to UVLO mode. In addition, if there is a lamp fault or the lamp is removed from the electronic ballast, the voltage on pins SD1 and SD2 increase to above 5.1 volts, and ballast control 10 again transitions from state 58 to state 52 or UVLO mode.

If there is an over current fault in the lamp, the voltage on connection CS increases to above 1.6 volts in run mode state 58, causing a transition to state 59 where ballast control 10 enters fault mode. In fault mode, a fault latch is set, the half-bridge is turned off and a quiescent current supply of approximately 180 microamps is provided to ballast control 10 to maintain the circuit active. Digital oscillator 11 is turned off, or half-bridge drivers 13, 14 are disabled. Ballast control 10 remains in state 59 until a lamp fault or power disruption returns ballast control 10 to state 52, or UVLO mode.

During normal run mode, if hard switching occurs in the half-bridge composed of switches M1 and M2, for example, due to an open filament or the removal of the lamp, the fault condition is detected through the voltage across current sensing resistor RCS. This voltage, supplied to connection CS, exceeds an internal threshold of 1.6 volts in a fault condition, shifting the state of ballast control 10 into fault mode. At that point, the gate driver outputs HO and LO are latched to a logic low state, for example.

Ballast control 10 also detects low voltage bus conditions that may cause the resonant output stage of the electronic ballast to operate at a frequency near or below resonance. This type of operation can produce hard switching in the half-bridge, which can damage the half-bridge switches, M1 and M2. Ballast control 10 provides a low DC bus voltage protection by shifting the output frequency of digital oscillator 11 higher to obtain a safe operating point above the resonant frequency. Ballast control 10 attempts to maintain this condition for as long as possible to avoid causing the lamp to extinguish and to avoid hard switching. When the under voltage condition is removed, the gas discharge lamp can be automatically ignited once the DC bus voltage returns to a normal level.

Current sensing pin CS in ballast control 10 detects a voltage related current supplied through the switching half-bridge. If the voltage applied to pin CS exceeds 1.6 volts, once the current sensing function is enabled in pre-heat mode, ballast control 10 transitions to fault mode and latches the gate driver outputs to a low logic state, for example. In addition, the pre-heat time is loaded into the timer in control logic 12 and digital oscillator 11 is disabled in fault mode. Ballast control 10 maintains the fault mode state until voltage VCC is recycled below the UVLO− going turnoff threshold, UVLO−, or until shut down pins SD1 and SD2 are pulled above 5.1 volts. When either of these conditions occur, ballast control 10 transitions to UVLO mode, where a reinitialization of the electronic ballast may occur. In UVLO mode, with the appropriate operating parameters, ballast control 10 will attempt to resume normal operation mode once voltage VCC is above the turn on threshold UVLO+ and the voltage and pins SD1 and SD2 is below 4.5 volts.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. An electronic ballast control for controlling a power switch in an electronic ballast to switch power to a load, comprising:
   a storage device for storing parameters to operate ballast control components;
   a control device coupled to the storage device for reading parameters from the storage device and providing the parameters to the ballast control components;
   an oscillator coupled to the control device for receiving the parameters from the control device and providing an oscillation signal based on the received parameters;
   an output section coupled to the oscillator and operable to receive the oscillation signal and produce signals for operating the power switch;
   wherein the control is implemented as a single integrated circuit; and
   further comprising a minimum frequency signal applied to the oscillator to determine a minimum oscillation frequency provided by the oscillator.

2. The control according to claim 1, further comprising a passive component coupled to the oscillator to provide the minimum frequency signal.

3. The control according to claim 1, further comprising an input device coupled to the storage device for inputting data to the storage device.

4. The control according to claim 3, further comprising an input data to the input device, wherein the input device is operable to translate the input data to a format suitable for input to the storage device.

5. The control according to claim 1, wherein the storage device is a digital storage device.

6. The control according to claim 1, wherein the control device is a digital control device.

7. The control according to claim 1, wherein the control device is programmable with parameters from the storage device, whereby the control is operable to obtain variable operating characteristics based on parameter programming.

8. An electronic ballast control for controlling a power switch in an electronic ballast to switch power to a load, comprising:
   a storage device for storing parameters to operate ballast control components;
     a control device coupled to the storage device for reading parameters from the storage device and providing the parameters to the ballast control components;
     an oscillator coupled to the control device for receiving the parameters from the control device and providing an oscillation signal based on the received parameters;
     an output section coupled to the oscillator and operable to receive the oscillation signal and produce signals for operating the power switch;
     wherein the control is implemented as a single integrated circuit; and
     wherein the oscillator is a digital oscillator.

9. An electronic ballast control for controlling a power switch in an electronic ballast to switch power to a load, comprising:
   a storage device for storing parameters to operate ballast control components;
   a control device coupled to the storage device for reading parameters from the storage device and providing the parameters to the ballast control components;
   an oscillator coupled to the control device for receiving the parameters from the control device and providing an oscillation signal based on the received parameters; and
   an output section coupled to the oscillator and operable to receive the oscillation signal and produce signals for operating the power switch,
   wherein the oscillator is a digital oscillator, and
   further comprising a DAC in the oscillator for converting an input digital signal to an analog signal, whereby the oscillation frequency is related to the analog signal.

10. A method of operating an electronic ballast, comprising:
    storing data in a storage device related to ballast control parameters;
    reading data from the storage device to obtain parameters for operating the ballast control; and
    applying the parameters to ballast control components to obtain selected operating points for the components, including applying a digital oscillator control signal to a digital oscillator in the control, and D/A converting said oscillator control signal to an analog signal, whereby the oscillation frequency is related to the analog signal;
    whereby the ballast control outputs a control signal based on a selection of parameters applied to the components.

11. The method according to claim 10, wherein storing data in the storage device further comprises applying a storage input signal to an input coupled to the storage device; and
    applying an enable signal to another input coupled to the storage device to enable the data signal to be accepted and stored by the storage device.

12. The method according to claim 10, wherein the data is digital data.

13. The method according to claim 12, further comprising selectively applying the digital data to the ballast control components to obtain operating set points for the ballast control.

14. The method according to claim 10, further comprising applying a minimum frequency signal to said oscillator component in the ballast control to determine a relative minimum switching frequency for the ballast control.

15. The method according to claim 10, further comprising providing a buffered voltage bias in the ballast control that is decoupled from an AC input.

16. A method of operating an electronic ballast, comprising:
    storing data in a storage device related to ballast control parameters;
    reading data from the storage device to obtain parameters for operating the ballast control; and
    applying the parameters to ballast control components to obtain selected operating points for the components,
    whereby the ballast control outputs a control signal based on a selection of parameters applied to the components,
    further comprising counting a number of events in the ballast control to determine when the number of events reach a predetermined value in a specified time period.

17. A method of operating an electronic ballast, comprising:
- storing data in a storage device related to ballast control parameters;
- reading data from the storage device to obtain parameters for operating the ballast control; and
- applying the parameters to ballast control components to obtain selected operating points for the components,
- whereby the ballast control outputs a control signal based on a selection of parameters applied to the components,
- further comprising timing one or more events to determine if a predetermined time duration is achieved for the one or more events.

18. A ballast control IC, comprising:
- a digital memory for storing control parameters;
- a digital controller coupled to the memory for reading parameters from the memory;
- a digital oscillator coupled to the controller for receiving a digital oscillation set point and providing an oscillation signal based on the set point.

19. The IC according to claim 18, further comprising a digital counter for counting a number of events and providing an indication if a predetermined count is reached.

20. The IC according to claim 18, further comprising a timer in the controller for timing an event and outputting a signal if a predetermined duration of time passes related to the event.

21. An electronic ballast control for controlling a power switch in an electronic ballast to switch power to a load, comprising:
- a storage device for storing parameters to operate ballast control components;
- a control device coupled to the storage device for reading parameters from the storage device and providing the parameters to the ballast control components;
- an oscillator coupled to the control device for receiving the parameters from the control device and providing an oscillation signal based on the received parameters;
- an output section coupled to the oscillator and operable to receive the oscillation signal and produce signals for operating the power switch;
- wherein the control is implemented as a single integrated circuit; and
- further comprising an input section of said integrated circuit for inputting said parameters, said input section comprising only two pins of said integrated circuit for receiving a data signal and a clock signal, respectively.

22. The control according to claim 21, wherein said input section is further for inputting a plurality of additional parameters for operating a corresponding additional plurality of said ballast control components.

23. An electronic ballast control for controlling a power switch in an electronic ballast to switch power to a load, comprising:
- a storage device for storing parameters to operate ballast control components;
- a control device coupled to the storage device for reading parameters from the storage device and providing the parameters to the ballast control components;
- an oscillator coupled to the control device for receiving the parameters from the control device and providing an oscillation signal based on the received parameters;
- an output section coupled to the oscillator and operable to receive the oscillation signal and produce signals for operating the power switch;
- wherein the control is implemented as a single integrated circuit; and
- wherein said integrated circuit has a pair of shut-down pins for inputting control parameters corresponding to a pair of loads, said control parameters enabling said control to shut down if one load is removed, and/or to continue running if one load is removed, and/or to initiate a startup operation when a removed load is replaced by a new load.

* * * * *